United States Patent [19]
Takanashi et al.

[11] Patent Number: 5,227,902
[45] Date of Patent: Jul. 13, 1993

[54] SPATIAL LIGHT MODULATOR WITH A PHOTOCONDUCTOR ON EACH SIDE OF A LIGHT MODULATION LAYER

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokahama, Japan

[21] Appl. No.: 700,475

[22] Filed: May 15, 1991

[30] Foreign Application Priority Data

May 16, 1990 [JP] Japan .................. 2-126316

[51] Int. Cl.$^5$ .................... G02F 1/135
[52] U.S. Cl. .................... 359/72; 359/245; 359/318; 359/70
[58] Field of Search ........ 359/72, 70, 245, 262, 359/315, 318

[56] References Cited

FOREIGN PATENT DOCUMENTS

| | | | |
|---|---|---|---|
| 2610735 | 8/1988 | France ...................... | 359/72 |
| 58-190922 | 11/1983 | Japan ...................... | 359/72 |
| 63-110416 | 5/1988 | Japan ...................... | 359/245 |
| 63-116119 | 5/1988 | Japan ...................... | 359/245 |

*Primary Examiner*—John S. Heyman
*Assistant Examiner*—Ron Trice
*Attorney, Agent, or Firm*—Michael N. Meller

[57] ABSTRACT

A spatial light modulator which includes a light modulation layer which is interposed between two photoconductive layers and laminated to both layers; the two photo conductive layers have charge images written thereon, respectively, by illumination of a writing light carrying optical information; the illumination direction of the writing light to the photoconductive layers are different from each other; and the two photoconductive layers permit the reading light to pass therethrough. When illuminated by a reading light via either of the first or second photoconductive layers, the light modulation layer optically modulates the reading light in accordance with the first and second charge images, under the presence of a voltage applied to the modulator. Thus it reads read out the first information and second information. The first and second photoconductive layers permit the reading light to pass therethrough.

2 Claims, 2 Drawing Sheets

SPATIAL LIGHT MODULATOR WITH A PHOTOCONDUCTOR ON EACH SIDE OF A LIGHT MODULATION LAYER

BACKGROUND OF THE INVENTION

The present invention relates to a spatial light modulator suitable for display apparatus, camera apparatus and optical computers and the like, and more particularly, to an improved spatial light modulator with respect to two items of information.

A conventional spatial light modulator is shown in FIG. 1. In the figure, a spatial light modulator 11 has laminates of a photoconductive layer 5 and a light modulation layer 7 between transparent electrodes 1 and 3. A drive source 9 is connected between the transparent electrodes 1 and 3.

Information writing is performed by irradiation of a writing light that includes the information, as shown by an arrow F1. More specifically, the electric resistance of the photoconductive layer 5 changes in accordance with optical intensity of the writing light, and a charge image corresponding to the information that is to be written is formed at the boundary between the photoconductive layer 5 and the light modulation layer 7.

The reading of the written information is performed by allowing a read light to pass through the spatial light modulator 11 as shown by the arrow F2. The light modulation layer 7 is applied with an electric field caused by the charge image that has been formed corresponding with the write information, and is in a status where light modulation is performed so as to correspond to the intensity of this field. Because of this, the reading light is modulated in its intensity or polarization plane corresponding to the information written in the light modulation layer 7 and light-to-light conversion is performed.

However, in such conventional technology, when two items of different information are to be handled at the same time, it is necessary to provide two spatial light modulators and it is necessary to have a synthesis operation of the read images.

SUMMARY OF THE INVENTION

In the light of these problems described above, the present invention has as an object the provision of a spatial light modulator in which information is written by a writing light due to the photoelectric effect and from which the information is read out by a reading light due to light modulation.

The modulator comprises a first photoconductive layer exhibiting the photoelectric effect on a writing light carrying a first information, a light modulation layer laminated to the first photoconductive layer, which optically modulates the reading light and a second photoconductive layer laminated to the light modulation layer so as to sandwich, with the first photoconductive layer, the light modulation layer therebetween, exhibiting the photoelectric effect on a writing light carrying a second information.

According to the spatial light modulator of the present invention, there is provided a photoconductive layer with respect to each of the two surface of the light modulation layer and so there is the effect that it is possible to handle two images by a simple method.

The other objects and features of this invention will become understood from the following description with reference to the accompanying drawings.

DETAILED DESCRIPTION OF THE PREFERRED EMBODIMENTS

The following is a detailed description of a first embodiment of the spatial light modulator of the present invention, with reference to the appended drawings.

Figure 1:
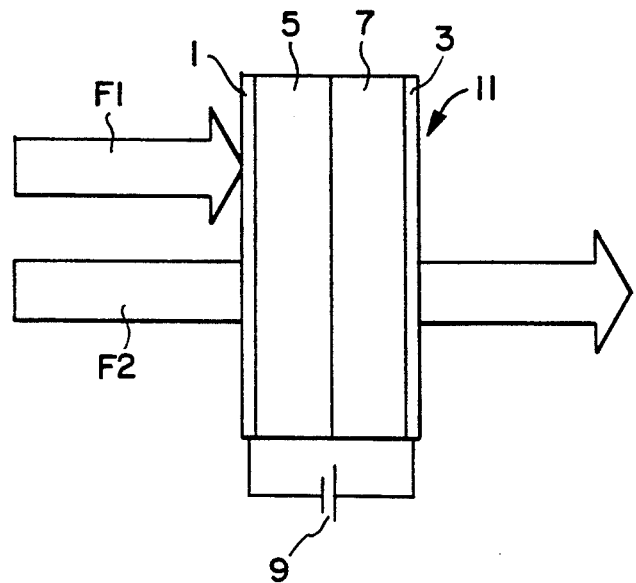
FIG. 1 is a view describing a conventional embodiment.
Figure 2:
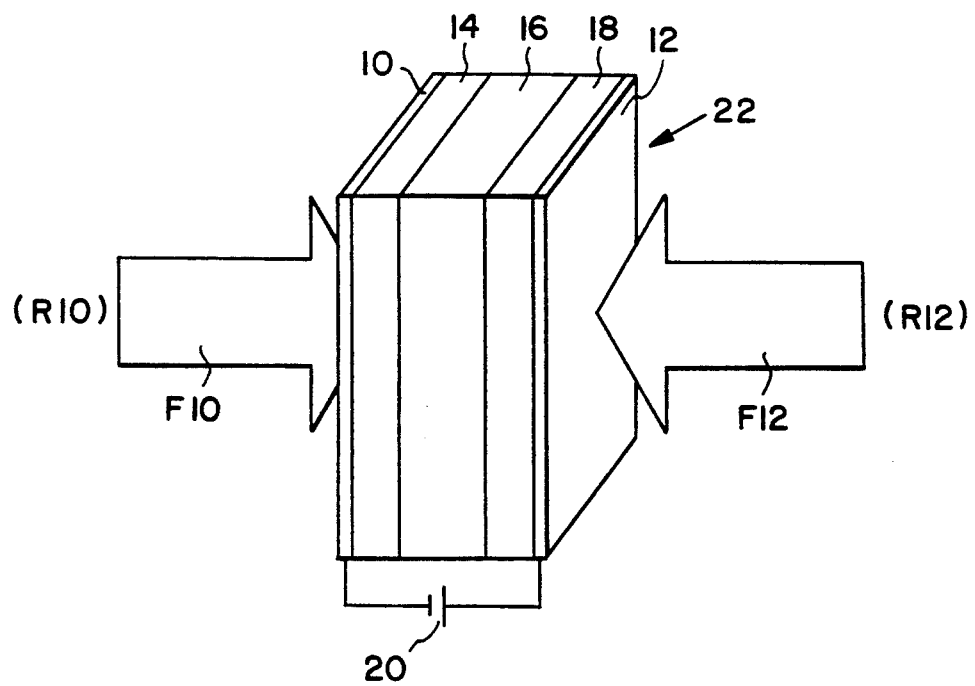
FIG. 2 and FIG. 3 are views describing a first embodiment of a spatial light modulator according to the present invention.
Figure 3:
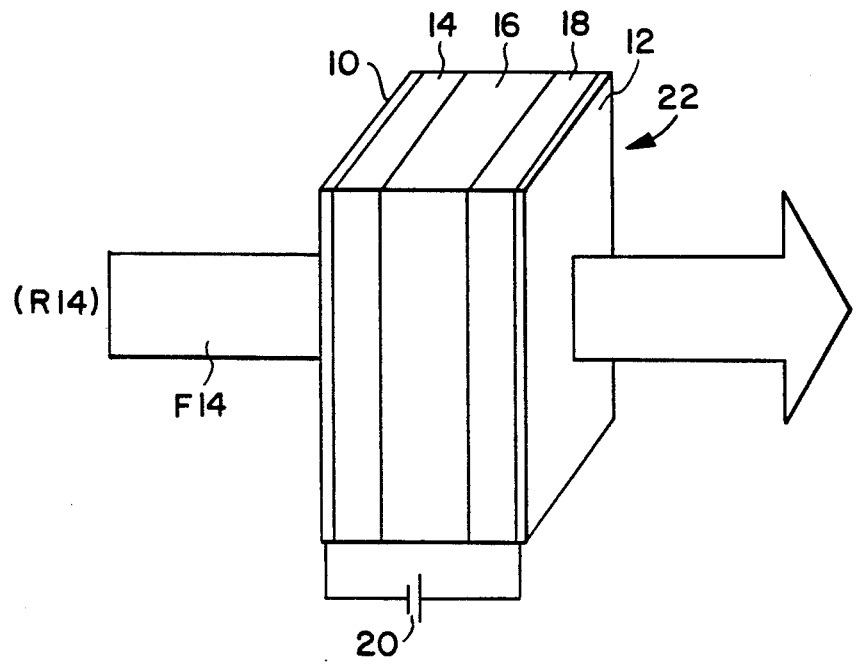

The description will begin with a description of a first embodiment of the spatial light modulator of the present invention, with reference to FIG. 2 and FIG. 3. In FIG. 2, a spatial light modulator 22 comprises transparent electrodes 10 and 12 and successive lamination of a first photoconductive layer 14, a light modulation layer 16 and a second photoconductive layer 18 between the electrodes 10 and 12. A drive power source 20 is connected between the transparent electrodes 10 and 12.

The transparent electrodes 10 and 12 are formed by ITO (Indium-Tin Oxide) or the like. In addition, the photoconductive layers 14 and 18 are formed by an organic photosensitive substance such as PVK (PolyVinyl Carbazole), an azo-system photosensitive substance or phthalocyanine, electro-optical crystal BSO (Bismuth Silicon Oxide), amorphous silicon or the like. Furthermore, the light modulation layer 16 is for example, formed by a high-polymer crystal dispersion membrane that operates by a scattering mode or a TN (Twist Nematic) type of crystal that demonstrates a birefringent characteristic or an photoelectric crystal such as niobic acid lithium for example.

The first writing light R10 that performs information writing to the first photoconductive layer 14, is irradiated to the spatial light modulator 22 as shown by an arrow F10. In addition, the second writing light R12 that performs writing of information to the second photoconductive layer 18 is irradiated to the spatial light modulator 22 as shown by an arrow F12. Furthermore, the reading light R14 that performs reading of information to the light modulation layer 16 is irradiated to the spatial light modulator 22 as shown by an arrow F14 (or its opposite) in FIG. 3.

In this embodiment, it is desirable that the optical characteristics of the first photoconductive layer 14 is high sensitive to the first writing light R10, but is of lower sensitivity and transparent to the reading light R14, and that of the second photoconductive layer 18 is highly sensitive to the second writing light R12, but is of low sensitivity and transparent to the reading light R12.

The following is a description of the operation of the first embodiment as described above. In the following description it is assumed that the light modulation layer 16 does not exhibit a memory function. For writing to and reading from the spatial light modulator 22, the drive power source 20 applies a voltage between the transparent electrodes 10 and 12. In this status, as shown in FIG. 2, each of the first and second writing lights R10 and R12 are irradiated to the spatial light modulator 22. The electric resistance of the first and second photoconductive layers 14 and 18 are changed in accordance with the intensity distribution of the first and the second writing lights R10 and R12. This results in charge images corresponding to the intensity distribution of the first and second writing lights R10 and R12, that is, the information to be written is formed at the boundary of the light modulation layer 16 and the photoconductive layers 14 and 15. The voltage applied by the drive power source 20 may be set so that the charge image formed at the boundary of the photoconductive layer 14 and the light modulation layer 16 is not affected by the second writing light R12 or the other charge image is not affected by the first writing light R10.

For reading the information so written, as shown in FIG. 3, the reading light R14 is irradiated to the spatial light modulator 22. The first photoconductive layer 14 is transparent with respect to the reading light R14, and so the reading light R14 is irradiated to the light modulation layer 16 after passing through the first photoconductive layer 14. Because of the electric fields caused by the charge images of the information written on both sides of the light modulation layer 16, the reading light R14 is modulated corresponding to the electric field caused by the two written information, and is output through the second photoconductive layer 18.

As described above, the second photoconductive layer 18 is transparent to the reading light, and thus the reading light so modulated suffers no attenuation.

AND (logical product) or OR (logical sum) operation with respect to the two items of information can be performed according as the field strength generated by the charge image formed by the first and the second writing light R10 and R12, and the voltage applied between the electrodes 10 and 20.

In general, the light modulation layer has an upper and a lower threshold relating to the electric field applied on. The modulation effect of the light modulation layer starts at the lower threshold and then saturates at the upper threshold.

Therefore, where the field strength generated by any one of the information which is written on the both sides of the light modulation layer 16 and voltage applied between the electrodes 10 and 12 reaches at the upper threshold, the information written is ORed.

On the other hand, where the field strength generated in the same manner is lower than the lower threshold and where the field strength generated by the information written on the both sides of the layer 16 and the applied voltage exceeds the lower threshold, the information written is ANDed.

As has been described above, according to the present embodiment, the two items of information are written on both sides of the light modulation layer, respectively. Because of this, for example, after the spatial light modulator has been assembled into a required apparatus, the operation of changing the inclination of the spatial light modulator is facilitated.

Figure 4:
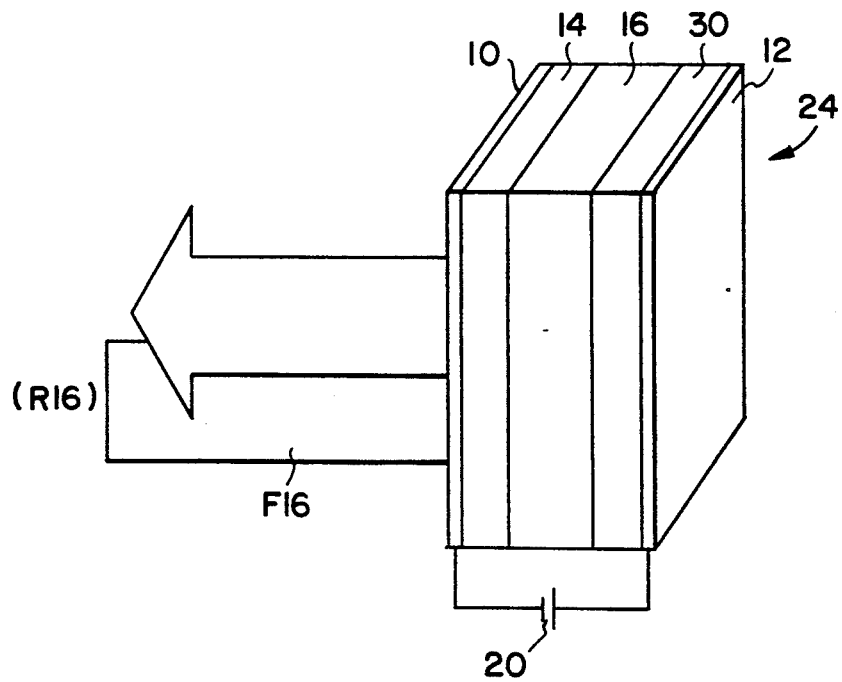
FIG. 4 is a view describing a second embodiment of a spatial light modulator according to the present invention.

The following is a description of a second embodiment of the present invention, with respect to FIG. 4. Moreover, those portions of this embodiment that correspond to portions of the first embodiment described above, are indicated with corresponding numerals.

In this second embodiment, the optical characteristics of a second photoconductive layer 30 are set so that there is a high sensitivity with respect to the second writing light R12, and so that it reflects the reading light R16. The other portions of this embodiment are the same as those of the first embodiment.

The following is a description of the operation of this second embodiment. The writing of information is the same as that described above for the first embodiment (see FIG. 2). When there is the reading of information, the reading light R16 is irradiated to a spatial light modulator 24 as shown by an arrow F16. This reading light R16 is irradiated to the light modulation layer 16 in the same manner as for the first embodiment. And in the light modulation layer 16, the reading light R16 receives light modulation corresponding to the writing information and is outputted to the side of the second photoconductive layer 30.

However, in this second embodiment, the second photoconductive layer 30 operates as a mirror surface with respect to the reading light R16 and so the reading light R16 is reflected and is outputted to the irradiation side of the spatial light modulator 24. In this embodiment as well, it is possible to obtain an effect the same as that of the first embodiment described above.

Moreover, the present invention is not limited to the embodiments described above. For example, it is possible to have appropriate settings corresponding to the necessity of shape and material for each portion. The writing of information need not necessarily be simultaneous.

In the previous embodiments, the erasing of information can be performed by the irradiation of appropriate light to the photoconductive layers 14 and 18 by short-circuiting the transparent electrodes 10 and 12.

When alternating current is used as the power source 20, information reading and writing is performed simultaneously. When this is done, stopping information writing performs the erasing of information. In addition, with the previously described embodiment, it was assumed that the light modulation layer 16 had no memory characteristic but when there is a memory characteristic, it is possible to use either alternating current or direct current as the drive power source, and the writing and reading of information can be performed either simultaneously or independently of each other. Erasing of information in this case can be performed by impressing heat when a high polymer-liquid crystal film is used as the light modulation layer, or by impressing an intense electric field when a PLZT (lead lanthanum zirconate titanate) is used as the light modulation layer, or by impressing a reverse electric field when a liquid crystal with a strong dielectric characteristic is used.

The erasing of information in such a case can be performed by erasing only one of the items of information and then rewriting.

In addition, for example, the writing and the reading can be performed by surface irradiation of light with respect to the spatial light modulator or can be performed by beam scan. In this manner, the drive method for the spatial light modulator, that is, the information writing, reading and erasing method can also be performed using various methods without being limited to the embodiment described above. In the present invention, the light can be visible light, infrared light, ultraviolet light or light of some other electromagnetic radiation as long as the operation is the same.

What is claimed is:
1. A spatial light modulator comprising:
   a first photoconductive layer on which a first charge image corresponding to a first information is writ- ten, when illuminated by a first writing light carrying said first information;

a second photoconductive layer on which a second charge image corresponding to a second information is written, when illuminated by a second writing light carrying said second information;

an illumination direction of said second writing light being different from an illumination direction of said first writing light;

a light modulation layer interposed between said first and second photoconductive layers which optically modulates a reading light in accordance with said first and second charge images while under the presence of a voltage applied to said modulator, thereby reading a combination of said first and said second information; and said first and second photoconductive layers permitting said reading light to pass therethrough.

2. A spatial light modulator comprising:

a first photoconductive layer on which a first charge image corresponding to a first information is written, when illuminated by a first writing light carrying said first information;

a second photoconductive layer on which a second charge image corresponding to a second information is written, when illuminated by a second writing light carrying said second information;

an illumination direction of said second writing light being different from an illumination direction of said first writing light;

a light modulation layer interposed between said first and second photoconductive layers which optically modulates a reading light in accordance with said first and second charge images while under the presence of a voltage applied to said modulator, thereby reading a combination of said first and said second information; and said first photoconductive layer permitting said reading light to pass therethrough and said second photoconductive layer having a layer portion which reflects said reading light.

* * * * *